Aug. 2, 1960  S. D. ALEXANDROFF  2,947,583
PISTON ASSEMBLY
Filed Sept. 2, 1958  3 Sheets-Sheet 2
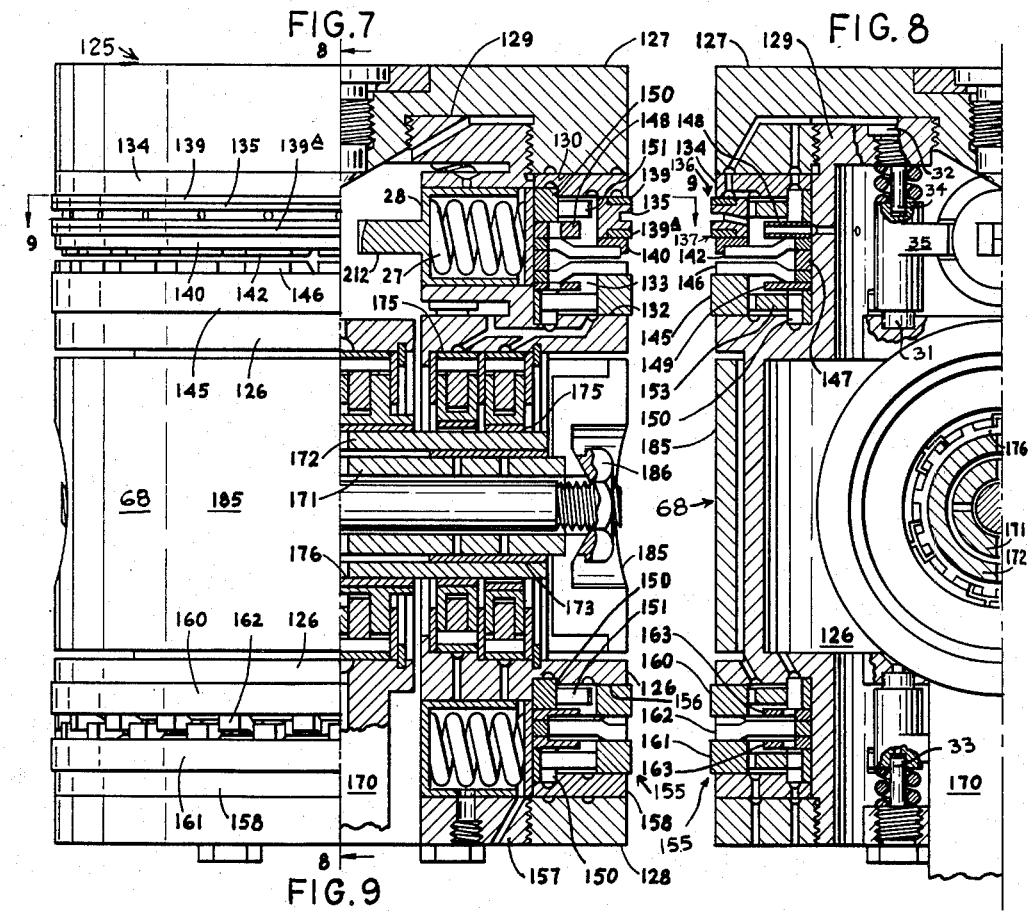
INVENTOR.
SERGEI D. ALEXANDROFF.
BY Alexander Riaboff
ATTORNEY Aug. 2, 1960  S. D. ALEXANDROFF  2,947,583
PISTON ASSEMBLY
Filed Sept. 2, 1958  3 Sheets-Sheet 3
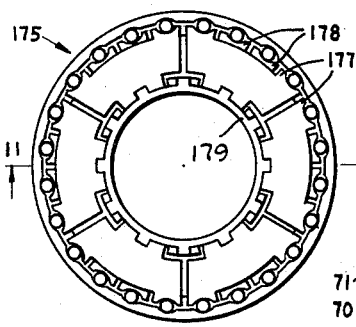
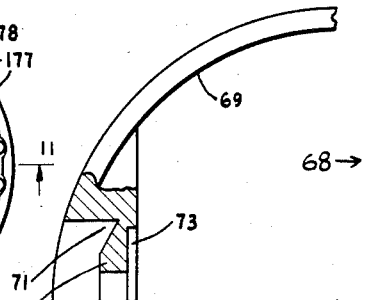
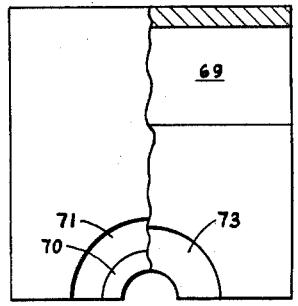
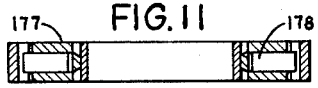
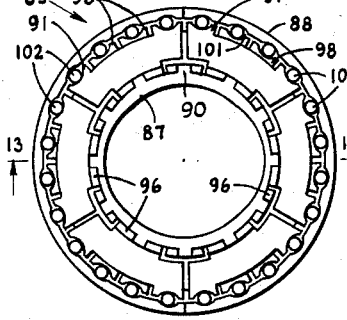
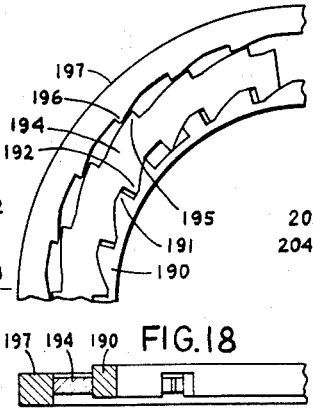
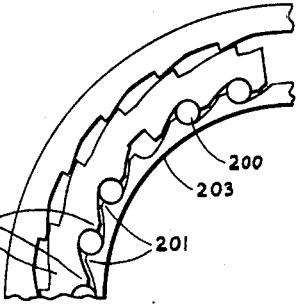
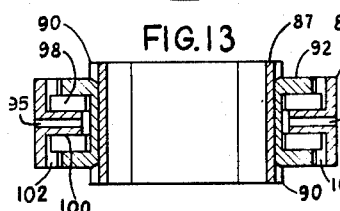
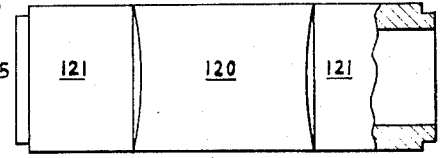
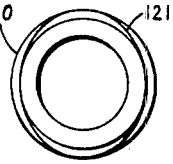
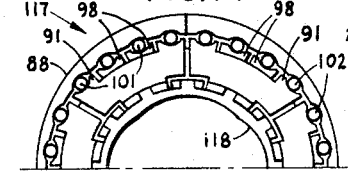
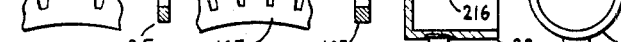
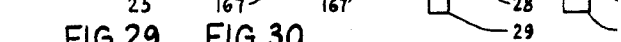
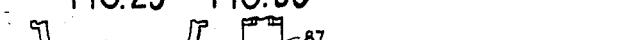
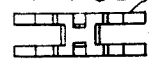
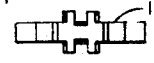
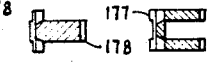
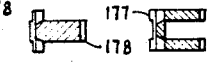
INVENTOR.
SERGEI D. ALEXANDROFF.
BY Alexander Rabof
ATTORNEY United States Patent Office 2,947,583
Patented Aug. 2, 1960

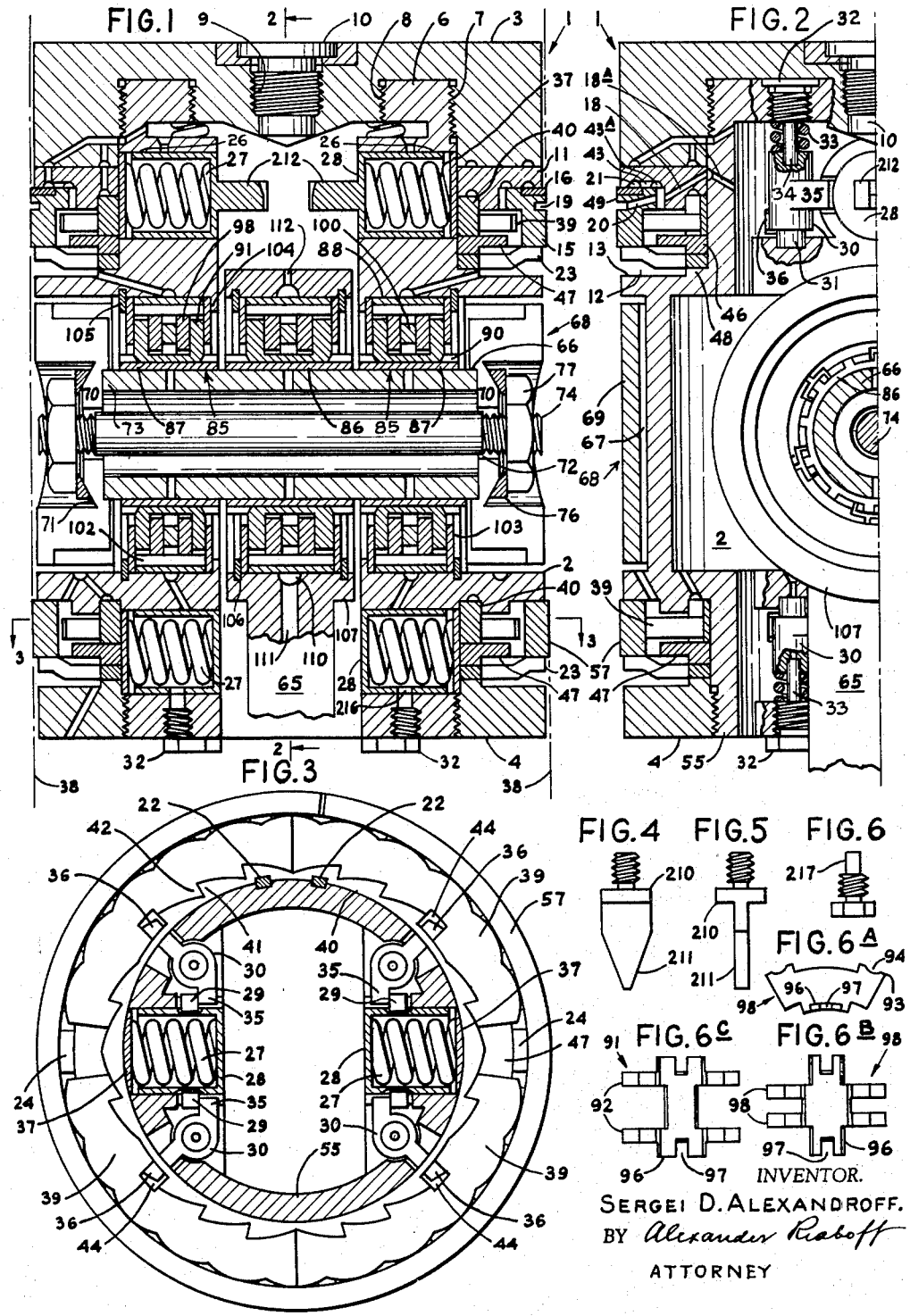

2,947,583

PISTON ASSEMBLY

Sergei D. Alexandroff, San Francisco, Calif.

Filed Sept. 2, 1958, Ser. No. 758,222

12 Claims. (Cl. 309—10)

This invention relates to a piston assembly for a gas engine, such as a diesel or high compression engine.

Each piston has one or several compression rings arranged in the top thereof. The groves, wherein the rings are located, are made somewhat wider than the thickness of the ring. The gas from the explosion chamber passes between the piston and the cylinder to the compression ring, presses the same downwardly, and through the clearance between the ring and upper wall of the groove behind said ring and presses radially the same against the cylinder wall. The pressure of the gas is at its maximum when the piston is in the uppermost part of the cylinder. Consequently, the radial pressure of said gas on the ring is also great at that moment, and, consequently, the ring causes the greatest wear of the cylinder in the upper part thereof.

With each upward and downward stroke, the ever changing angle of the connecting rod in relation to the piston causes a lateral displacement of the piston from its normal central position to the position wherein the latter contacts the cylinder, said displacement being equal to the clearance between said piston and the cylinder wall.

The object of this invention is to provide an improved piston assembly wherein the piston proper remains centrally located in the cylinder during the upward and downward strokes of the piston and the lateral force of the connecting rod is transferred directly to the cylinder through a special slide secured to the pin connecting said piston and rod.

Another object of this invention is to provide a piston assembly wherein the piston carries plurality of guide rings, said rings yieldably maintaining the piston in the alignment with the central axis of the cylinder wherein the piston reciprocates, said piston carrying slide secured to the pin connecting the piston with its connecting rod for transmitting the transverse force acting on said piston directly to the cylinder.

In order to permit said slide and the pin to move laterally, there must be a play between the pin and the piston bearings, wherein it rotates, exceeding the size of the clearance between the piston and the cylinder.

This has been heretofore a practical impossibility, as an ordinary bearing with an increased side clearance, to accommodate the lateral displacement of said pin, would be quickly worn out due to the great reciprocating force acting on said pin.

The other object of this invention is to make use of a specially designed elastic bearing particularly described in my copending patent application filed May 19, 1958, Serial No. 736,059, which is adapted to permit the displacement of the pin in relation to said piston for a distance slightly exceeding the clearance between said piston and the cylinder.

Another object of this invention is to provide special means for pressing the compression rings upwardly so as to close the clearance between the top of the ring and the upper surface of the ring groove.

Still another object of this invention is to provide special spring means for exerting a predetermined radial pressure on said guide ring and to press the same with uniform force against the cylinder wall, which force is independent from the gas pressure in the explosion chamber.

Other objects and advantages will appear as the specification proceeds and the novel features of the device will be particularly pointed out in the claims hereto annexed.

In this specification and the annexed drawings, the invention is illustrated in the form considered to be the best, but it is understood, that the invention is not limited to such form; and it is also to be understood that in and by the claims following the description, it is desired to cover the invention in whatsoever form it may be embodied.

My invention is illustrated in the accompanying drawings in which:

Fig. 1 is a central vertical section of a piston assembly comprising the subject matter of my invention.

Fig. 2 is a partial central vertical section of said piston assembly taken on the line 2—2 of Fig. 1.

Fig. 3 is a horizontal section of the piston assembly taken substantially along the line 3—3 of Fig. 1, some parts being shown in elevation.

Figures 4 and 5 are the front and side view respectively of the top insert to keep the ring coil springs compressed.

Fig. 6 is the bottom lock for the cylinder containing the ring coil spring to keep the same compressed.

Fig. 6A is a front view of a bearing spring.

Figs. 6B and 6C are plan views of two different bearing springs.

Fig. 7 is a side view of a modified form of my piston assembly, one half thereof being shown in section.

Fig. 8 is a vertical central cross-section of the latter piston assembly taken along the line 8—8 of Fig. 7.

Fig. 9 is a horizontal sectional view taken substantially along the line 9—9 of Fig. 1, some parts being shown in elevation.

Figures 9A and 9B show a front view and a section through a special conical washer.

Fig. 10 is a front view of a special elastic bearing.

Fig. 11 is a central cross-section of said bearing taken along the line 11—11 of Fig. 10.

Fig. 12 is a front view of a modified form of said elastic bearing.

Fig. 13 is a central cross-section of said bearing taken along the line 13—13 of Fig. 12.

Fig. 14 is a partial front view of another modified form of said elastic bearing.

Fig. 15 is a partial plan view, partly in section, of a half slide.

Fig. 16 is a side view, partly in section, of said half slide.

Fig. 17 is a modified form of a guide ring and its pressure transmitting mechanism.

Fig. 18 is a section of Fig. 17.

Fig. 19 is another modified form of a ring and its pressure transmitting mechanism.

Fig. 20 is a section of Fig. 19.

Fig. 21 is a front view of a modified form of a pin connecting the piston and the connecting rod.

Fig. 22 is a side view of Fig. 21.

Fig. 23 is a partial plan view of the upper ring star spring.

Fig. 24 is a cross-section through Fig. 23.

Fig. 25 is a partial plan view of the lower ring star spring, as used in the modified form shown in Figs. 7–9.

Fig. 26 is a cross-sectional view through Fig. 25.

Fig. 27 is a central vertical cross-section through a coil spring container.

Fig. 28 is a side view of Fig. 27.

Fig. 29 is a partial front view of the inner sleeve of the flexible bearing.

Fig. 30 is a side view of Fig. 29.

Fig. 31 is a front view of a spring of the bearing shown in Figs. 10 and 11.

Fig. 32 is a bottom view of the spring shown in Fig. 31.

Fig. 33 is a bottom view of another spring used in the bearing shown in Figs. 10 and 11.

Fig. 34 is a section through the spring shown in Fig. 33, and

Fig. 35 is a section through the spring shown in Fig. 32.

In detail my piston assembly includes a piston 1 shown in Figs. 1–3, which consists of three parts: a piston body 2, a piston head 3 and a skirt 4. The body 2 is of a generally cylindrical shape and is hollow inside. It includes a neck 6 open at the top and having its upper portion threaded outwardly as at 7 and inwardly as at 8, which threads fit into corresponding threads of the piston head 3 for better withstanding the temperature variations in the latter.

The piston head 3 is of generally cylindrical shape and has an opening 9 in the center thereof, the purpose of which shall be disclosed hereinafter, which opening is closed by a threaded plug 10. A locking ring 11 is provided under the head 3, the purpose of which shall be described hereinafter. There is a larger circular groove 12 in the piston 1 formed by the lower surface of the ring 11, the neck 6, and the lower horizontal surface 13 of said body, in which groove a specially designed guide ring 15 is inserted. The latter carries a special compression ring 16 inserted in the upper outer edge of said compression ring. The ring 15 is provided for the purpose of supporting and carrying said ring 16 and covering the gap between the ends of the compression ring 16, and thus preventing the passage of gas therethrough. A circular gas groove 19 is provided in the ring 15 a short distance under the ring 16, for the purpose of collecting gas which may pass by the ring 16, and which is directed inside of said piston by a passage 20.

The upper surfaces of the rings 15 and 16 abut the lower surface of the locking ring 11, which is prevented from rotation by a key 22.

The rings 15 and 16 are pressed against said ring 11 by a star spring 23. The latter includes a plurality of radial spring offset fingers 24 connected by a ring 25. The fingers 24 abut the compression ring 15 and press the same upwardly against the locking ring 11. The upward pressure of the spring 23 is greater than the downward pressure of gas on the ring 16, and inertia forces of the rings 15 and 16 and, therefore, the rings 15 and 16 remain pressed against the lower side of the ring 11 at all times.

I provide a special mechanism for exerting constant radial pressure upon the ring 15, urging said ring outwardly which pressure is independent from the pressure of gas. The latter mechanism consists of a pair of diametrically opposite coil springs 27, each inserted in a cylinder 28 having its inner end closed, which cylinder is slidably arranged in the piston body 2. The spring 27 with its piston 28 is inserted through a hole 26 in the piston body 2, which hole is thereafter closed by a special washer 37. The springs 27 abutting the washers 37, urge said cylinders inwardly. The latter cylinders are provided with a pair of opposite diametrically located ears 29. A bell crank 30 is swingably arranged in close vicinity of each of said ears 29. Lower end of the bell crank 30 formed with a shaft 31, which is slidably received in the piston body 2; the upper end of the crank moves around an extension 34 of a plug 32. A spring 33 yieldably presses the bell crank 30 downwardly.

The bell crank 30 is operatively connected with the ears 29 by its arm 35 while its other arm 36 passes through the piston's wall and engages a special toothed quadrant 39. There are four spring cylinders 28, each having its own spring 27 and a bell crank 30 operating one of four quadrants 39.

Each quadrant 39 is placed between the guide ring 15 and a stationary toothed ring 40 having ratchet teeth 41 which are divided in four sections, each having its teeth directed away from the vertical diameter, as shown in Fig. 3. The quadrants 39 are also formed with teeth 42 which fit in the teeth 41 of said stationary ring 40.

The arms 36 of the bell cranks 30 pass through the stationary ring 40 into special notches 44 in said quadrants 39 and pull the latter circumferentially toward the horizontal diameter, viewing Fig. 3.

The latter movement of said quadrants forces the teeth 42 to ride on said teeth 41 of the stationary toothed ring 40 and thus moves said quadrants 39 away from the piston body 2, thus forcing the rings 15 and 16 to expand and move outwardly to contact the cylinder wall 38.

The outward pressure of the quadrants 39 on the guide ring 15 is constant and independent from the gas pressure in said cylinder, and the outward movement of said ring is dependent only on said outward pressure of the quadrants 39 and the friction between the rings 15 and 16 and the retaining ring 11, which in turn depends upon the pressure of the star spring 23 on the ring 15.

The stationary toothed ring 40 is locked between the retaining ring 11, which sits on the top of said ring, and an auxiliary ring 46 which in turn sits on the star spring 23. The auxiliary ring 46 is formed with a horizontal circular lip 47 which slidably supports the quadrants 39. The spring 23 on the shoulder 48 provided on the lower horizontal surface 13 of the groove 12. The pressure of the piston head 3 upon the retaining ring 11 holds the stationary toothed ring 40 and the star spring 23 which firmly presses the rings 15 and 16 against the under surface of the retaining ring 11, and yet permits the rings 15 and 16 to slide outwardly under the pressure of the quadrants 39 to contact the inner wall of the cylinder 38. The firm constant pressure of the rings 15 and 16 on the cylinder wall securely prevents the passage of gases from the explosion chamber above said piston, between said rings and said cylinder. However, if any gases should pass said ring 16 and the portion 49 of said ring 15 under the ring 16, said gases will be trapped by the gas groove 19 and directed therefrom by passages 20 into passages 18 and therefrom through passages 18A into the inner hollow of said piston. A round passage 21 is provided above the compression ring 16 for collecting gases which may penetrate between the same and the locking ring 11, which gases are directed by a plurality of short radial passages 43 into a second circular passage 43A which communicates with the above mentioned passages 18.

The radial pressure of the quadrants 39 on the ring 15 and the upward pressure of the star spring 23 on said ring are sufficient to keep the piston 1 in the center of the cylinder all the time during the upward and downward strokes.

The lower part of the piston includes a lower cylindrical neck 55 threaded outwardly. The skirt 4 is screwed on said lower neck to hold in place the lower star spring 23, which presses upwardly against the body 2 a lower guide ring 57. The latter ring is pushed constantly radially outwardly by the same arrangement of the stationary tooth ring 40, and the quadrants 39 associated therewith, and operated by the springs 27 in the cylinders 28 through the bell cranks 30.

It shall be noted that the lower cylinders 28 with their respective coil springs 27 are inserted in the cylinder body 2 from the inside of the piston hollow.

Hence, the shape of the opening 26 therefor is slightly different from that of the upper openings. In all other respects said cylinder and coil springs function the same, and are of the same shape and size.

The lower guide ring 57 also exerts constant equal pressure on the cylinder wall and firmly, though flexibly, guides the piston 1 in its up and down strokes. Thus the upper guide ring 15 and the lower guide ring 57 keep the piston 1 centrally located in the cylinder with freedom of upward and downward movement, during which the central vertical axis of the piston coincides with the central vertical axis of the cylinder wherein the piston reciprocates.

The piston assembly is connected to a connecting rod 65 by a hollow pin 66. The pin 66 carries attached thereto a slide 68 consisting of two identical halves, each having a substantially semi-circular wall 68 occupying a semi-circular indentation 67 in the piston body 2 and having an embossment 70 on each side. The latter is formed on its outer face with an outwardly beveled half circular groove 71 in the center of which is located an opening 72. A half circular depression 73, concentric with the opening 72, is provided on the back side of said embossment into which an end of the pin 66 enters.

When the half of the slide 68 is placed around the piston body 2 so that each end of the hollow pin 66 fits in the depression 73 and the other half of said slide is fitted the same way, a bolt 74 is passed through said hollow pin 66 and the openings 72 in the embossments 70. The bolt 74 is preferably threaded on both ends and carries on each end a bevelled washer 76 which fits into the bevelled groove 71. Nuts 77 tighten up the embossments 70 together and hold them securely attached to said pin, so that the halves of the slide 68 form a complete circular slide around the piston body 2. The pin 66 and the slide 68 oscillate and move as a unit.

The pin 66 is connected to the piston body 2 by means of two specially designed elastic bearings 85. A bearing 86 connects said pin to the connecting rod 65. The bearings 85 are so constructed and arranged on the pin 66 that they permit said pin to move laterally, that is, at the right angle to the central axis of said piston, the distance equal to the clearance between the piston and the cylinder wall. Each of the elastic bearings 85 consists of an inner sleeve 87, through which the pin 66 passes with freedom of rotation therein, a split outer sleeve 88 securely locked in the piston body 2, and a mechanism arranged between said sleeves by which the load of the pin 66 is distributed over a large area of the inner sleeve 87 and transmitted to a large area of the outer sleeve 88. The latter mechanism includes a plurality of longitudinal equally spaced short ribs 90 provided on the outer surface of said sleeve 87, for preventing axial movement of the inner sleeve 87, said ribs being arranged in two rows, each row being near the edge of said sleeve, and the ribs of one row being opposite the ribs of the other row.

A plurality of double springs 91 are arranged on said inner sleeve 87. Each of the springs 91 consists of two parallel spring blades 92 which are shown in detail in Figs. 6A, 6B and 6C. Each spring blade 92 is arcuate in shape and formed with outwardly extending projections 93 at its ends, in which a substantially half circular indention 94 is provided. The spring blades 92 are connected by a bridge 96 having a notch 97 on each side of said bridge. Said inner ends of the ribs 90 are bevelled toward the opposite rib, and the notches 97 are also correspondingly bevelled, so that the bevelled end of the ribs 90 fits into the bevelled notches 97.

The double springs 91 are arranged on the inner sleeve 87 radially, as shown in Figs. 12 and 13. A second row of curved double springs 98 is arranged between the spring blades 92. Each of the springs 98 is provided with the bridge 96 having a pair of opposite notches 97 on the inner surface thereof into which notches the ribs 90 fit.

The outer sleeve 88 is provided with a centrally located inwardly directed circular rib 100 which projects between the inner blades of the spring 98 to prevent the longitudinal displacement of said sleeve in relation to said springs and to bring lubricating oil inside of said bearing through the passages 95. The outer sleeve 88 is also provided with a plurality of longitudinal grooves 101 which are located opposite the indentations 94 in the assembled bearing. A roller 102 is driven into each pair of the corresponding oppositely located circular indentation 94 and the groove 101 to hold said springs and the inner sleeve under constant tension which preferably equals to one half of the maximum load on the pin 66. The bearing 85 is closed on each side by a disk 103. A shoulder 104 on the piston body 2 and a retaining ring 105 inserted in the piston body 2 securely hold each of the bearings 85 in place and prevent the lateral displacement of the same.

The bearing 86 connecting said pin 66 with the connecting rod 65 is about time and a half stronger than the bearing 85 and is of the same construction except that its inner sleeve is round, and it is retained by two retaining rings 106 located in the head 107 of said connecting rod. Any suitable bearing may be used instead of the bearing 86.

The operation of the elastic bearings 85 is as follows: when a downward load is applied on the pin 66, it presses on the inner sleeve 87, which in turn presses the spring 91 directly under it. The springs 91 bend very slightly under the pressure and the sleeve 87 consequently bends slightly outwardly. The springs 91 directly over the pressure area will be relieved partially of the constant pressure, and the springs to the right and to the left of said inner sleeve will be displaced downwardly slightly, whereby their pressure on the sides of the inner sleeve will be increased due to the fact that the downward displacement of the circular indentations 94 of the springs 91 in relation to the grooves 101 of the outer sleeve 88 forces the rollers 102 therebetween downwardly and inwardly in relation to said inner sleeve, thus compressing the latter at the sides a few thousandths of an inch. As the result of these forces, round upper and lower parts of the inner sleeve 87 assume slightly elliptical shape and increases the area of contact with the pin 66 up to one quarter of the area of the inner sleeve bore. Such increase of contact results in better distribution of the load on the inner sleeve, minimizes the effect of the impact of a sudden load on said bearing and, consequently, results in less wear. In the present adaptation, the elastic bearing 85 under the load of the combustion, will change its form to contact about one quarter of the pin's 66 surface.

The bearings 85 and 86 are pressed into their respective places in the piston body 2 and the head 107 and for that reason cannot rotate therein.

The head 107 of the connecting rod has a circular oil groove 110 which is connected with a source of oil under pressure by a passage 111 in the rod proper. An opening 112 is provided in the top of said head 107 for spraying oil against the inner surface of the piston head 3 for the purpose of cooling the same.

As it has been previously stated, the elastic bearings 85 permit certain lateral displacement of the pin 66 and of the connecting rod 65, leaving the piston body 2 undisturbed. This displacement may be accommodated by the combined elasticity of said bearings. As shown in Fig. 12, the inner surface of the sleeve 87 of the elastic bearing made oval, with the axis of the upper and lower part coinciding with the axis of the bearing and with different centers for the sides of the sleeve, the horizontal axis being longer than the vertical one a distance somewhat larger than the clearance between the piston and the cylinder wall surrounding the same, so that the lateral swing of the connecting rod 65 either way will bring the piston slide 68 in contact with the cylinder wall.

Fig. 14 shows a slightly modified form of the elastic bearing 117 in which the inner surface of the sleeve 118 is slightly oval, as has been described before, and the outer surface is elliptical, and the springs 91 are arranged elliptically so that the inner sleeve has equal thickness at the top, bottom and the sides.

Figs. 21 and 22 show a modified connecting rod pin 120, in which the surfaces 121 of the pin intended to be in the bearings 85 are made slightly elliptical, the difference between the horizontal and the vertical diameters being only a few thousandths of an inch. Such arrangement permits certain lateral movement of said pin in relation to the inner round sleeve. The bearing 85 is flexible enough to absorb the knocking load of the reciprocating piston and provide the surface contact between the pin 66 and said inner sleeve 87 up to a quarter of the area of the bore of the latter.

Figures 7, 8 and 9 show a modified form of the piston 125, specially designed for big diesel or combustion engines.

The piston 125 consists of a piston body 126, head 127 and skirt 128. The body 126 includes a neck 129 threaded outwardly and inwardly upon which the head 127 is screwed. The lower surface 130 of the head 127, said neck 129 and the upper surface 132 of the body 126 form a large circular groove 133 in the upper part of said piston. Said groove contains an upper retaining ring 134 located under the head 127 around the neck 129 under which ring an upper guide ring 135 is arranged. The latter has an upper and a lower circular indentation 136 and 137 respectively in which a compression ring 139 and an oil regulating ring 139A are fitted. A lower retaining ring 140 supports the rings 135, 139 and 139A. The ring is yieldably urged upwardly by a star spring 142 which is of the same design as the star spring 23, shown in Figs. 23 and 24.

The groove 133 also contains a lower guide ring 145, which is pressed downwardly by a star spring 146 against the surface 132. The spring 146 is of the same construction as the spring 142.

The guide rings 135 and 145 are urged radially outwardly by substantially the same mechanisms as the guide rings 15 shown in Figs. 1–3, which mechanism includes the coil springs 27 enclosed in the cylinders 28, said springs abutting the special washers 37 and urging said cylinders inwardly. The cylinders 28 have the ears 29 which operate the bell-cranks 30 in the manner as above described.

Fig. 9 shows that a stationary toothed ring 150 is arranged around the neck 129, wherein the ratchet teeth of the upper half are directed in a clockwise direction and those of the lower half in the opposite direction. A pair of half rings 151 is provided between the ring 150 and the upper guide ring 139. The inner surface of said half rings is formed with ratchet type teeth which fit the teeth of the stationary ring 150. The outer surface of said half rings is preferably made into a plurality of equally spaced curvatures 152, the highest point of which contacts the compression ring 135 for minimizing the friction therebetween.

Two of the bell cranks 30 urge the upper guide ring 135 outwardly by pulling the half rings 151 toward each other, viewing Fig. 9. The other two bell-cranks 30A operated by a coil spring 27 urge the lower compression rings 145 outwardly by pulling the lower half rings 153 in the opposite direction.

The star springs 142 and 146 are spaced by a spacing ring 147. Another spacing ring 148 separates the star ring 142 from the upper retaining ring 134 and supports the upper half rings 151. A spacing ring 149 is provided between the lower star spring 146 and the stationary ring 150. The above described rings and the stationary toothed rings 150 are held in place by the pressure of the piston head 127 transmitted thereon by the upper retaining ring 134.

The function of said upper and lower guide rings 135 and 145 respectively is to keep the piston 1 centered in the cylinder at all times. I prefer to show two separate upper guide rings 135 and 145, each held in place by a separate star spring, and thus divide the inertia force between said springs.

The skirt 128 in co-operation with the piston body 126, provides a lower groove 155 formed with the upper surface 156 of said piston body, the lower neck 157 and the upper surface of a locking ring 158 lying on the skirt 128 which is screwed on said neck. The groove 155 contains an upper and a lower guide ring 160 and 161 respectively, said rings being pressed upwardly and downwardly respectively by a double star spring 162, shown in detail in Figs. 25 and 26, wherein one spring prongs arranged alternately: one prong is directed upwardly and the next adjoining is directed downwardly to contact the upper and lower guide rings 160 and 161 respectively.

The double star spring 162 is arranged around the lower neck 157 of the piston body 126 between two spacing rings 163 the upper of which is slidably supporting the half rings 151. The springs 162 and the rings 163 are compressed between the upper and lower toothed rings 150. The latter rings in co-operation with the half rings 151 operate the upper and lower guide rings 160 and 161 in the manner and by the mechanism as above described in connection with the operation of the guide rings 135 and 145.

The guide rings 160 and 161 are provided mainly for the purpose of keeping the lower part of the piston 125 aligned with the cylinder during its up and down strokes by exerting constant and equal pressure on the cylinder wall.

The piston 125 is connected with its connecting rod 170 by a hollow pin 171 which is arranged in a hollow shaft 172. The latter is provided with a bushing 173 at each of its ends riding on said pin 171, whereby said shaft may rotate about said pin and roll in the bearings which connect the same with the piston body.

Two elastic bearings 175 connect said shaft 172 with the piston body 126 and one large elastic bearing 176 connects said shaft with the connecting rod 170. The round elastic bearings 175 are shown in detail in Figs. 10, 11, 31–35, and are of the same type and function in the same elastic type as the bearings 85 hereinabove described, the difference between said bearings being that the bore of the inner sleeve 179 thereof is round, that the bearing 175 is considerably narrower than the bearing 85 and for that reason the double springs 177 of the bearing 175 are somewhat narrower than the double springs 91 of the bearing 85, and may have single springs 178 within said double springs 177. The bearing 176 is of exactly the same type as the bearing 86 shown in Fig. 1.

The elastic bearings may be arranged differently on the shaft 172 as shown in Figs. 10, 12, 14, or 21, to take care of the lateral displacement of the shaft 172 in relation to the central vertical line of the piston 125. As shown in Fig. 7, they are arranged so that one of the bearings 175 is placed slightly, just a few thousandths of an inch, above the adjoining bearing 175, so that on a downward stroke of the piston 125 the shaft will press the first mentioned bearing, the lower portion of the inner sleeve of which is in contact therewith, and on the upper stroke of said piston the shaft 172 will press against the upper portion of the inner sleeve of the other bearing which portion is in contact therewith.

A slide 185 is secured to the hollow pin 171. The slide 185 is substantially the same as the slide 68 hereinbefore described, the difference between the two slides being that the bevelled washer 76 is omitted in the slide 185 and substituted by a special bevelled nut 186 which functions as both, the washer 76 and the nut 77. In all other details and functions the slides 185 and 68 are identical.

Figs. 17 and 18 show a different arrangement of a toothed stationary ring 190 having ratchet teeth 191, which fit into corresponding inner ratchet teeth 192 of a movable half ring 194. The latter ring is formed also with a set of outer ratchet teeth 195 which mesh with the corresponding ratchet teeth 196 formed on the guide ring 197. The ratchet teeth 191 and 192 are considerably deeper than the teeth 195 and 196. Therefore, when the half ring 194 is moved in clockwise direction, it will be moved away from the stationary ring 190 by the teeth 192 sliding on the teeth 191. At the same time the teeth 195 will be entering the teeth 196 and thus the distance between the half ring 194 and the guide ring 197 shall diminish. The outward radial movement of the half ring 194, however, will proceed at a faster rate than the compression ring's 197 motion inwardly toward said half ring with the net result that the compression ring 197 will be moved outwardly radially.

Figs. 19 and 20 show substantially the same arrangement of the stationary ring, half ring and compression ring, as shown in Figs. 17 and 18, except that a small roller 200 is placed between the ratchet teeth 201 and 202 of the stationary ring 203 and the half ring 204, which rollers minimize the friction between the teeth and, thus, provide a smoother and easier operation of the pressure ring expanding mechanism.

Figs. 4 and 5 show a top insert 210 in form of a wedge 211 which is adapted to be inserted through the hole 9, in the top of the head 3 of the piston before the piston 1 is inserted into a cylinder. The wedge 211 through the stems 212 extending from the cylinders 28 rearwardly, pushes said cylinders outwardly, thus compressing the coil springs 27 therein and whereupon the guide ring 15 is easily inserted into the cylinder. Thereafter the wedge 211 is removed and the plug 10 is screwed into the hole 9.

The lower coil springs 27 are kept compressed by a special lock 214, shown in Fig. 6, which is inserted into the bottom of the skirt 4 before the insertion of the piston 1 into the cylinder.

The cylinder 28 has a hole 216 therein into which the upper end 217 of the lock 214 is inserted after said cylinder has been pushed outwardly. Said lock holds the lower coil springs 27 contracted while the piston is inserted into said cylinder.

I claim:

1. A piston assembly arranged for reciprocation in a cylinder of an internal combustion engine including a piston and a pin connecting said piston with a connecting rod, said piston having an upper and a lower guide ring, means arranged in said piston for yieldably forcing said rings radially outwardly against the cylinder wall, said means and rings keeping said piston in longitudinal alignment with the cylinder, bearing means connecting said pin with the piston, said last mentioned means permitting said pin to move transversely in relation to said piston a distance equal at least to the clearance between said piston and the cylinder, a slide secured to said pin for contacting said cylinder when a transverse force applied by the connecting rod to said pin moves the latter and the slide laterally and for transferring said force directly to said cylinder wall.

2. A piston assembly arranged for reciprocation in a cylinder of an internal combustion engine, including a piston and a pin connecting said piston with a connecting rod, said piston having an upper and a lower groove on the cylindrical side thereof, an upper and a lower guide ring located in said upper and lower grooves respectively, means arranged in said piston for yieldably urging said rings radially outwardly toward and against the cylinder wall, means for forcing said rings upwardly against the upper walls of said grooves, said rings in co-operation with the above first and second mentioned means keeping the piston in longitudinal alignment with the cylinder wherein said piston reciprocates; elastic bearings connecting said pin with the piston with freedom of transverse motion of said pin in relation to said piston for a distance equal at least to the clearance between said piston and the cylinder, a cylindrical slide secured to the pin and adapted to move therewith for contacting the cylinder wall when transverse force of the connecting rod forces the pin to move transversely in relation to the piston, thereby bringing said slide in contact with the cylinder wall for transferring said force through said slide to said cylinder wall.

3. A piston assembly arranged for reciprocation in a cylinder of an internal combustion engine including a piston and a pin connecting said piston with a connecting rod, said piston having an upper and a lower groove on the cylindrical side thereof, an upper and a lower guide ring located in said upper and lower grooves respectively; means arranged in said piston for yieldably urging said rings radially outwardly toward and against the cylinder wall, means for forcing said rings upwardly against the upper walls of said grooves, said rings in co-operation with the above first and second mentioned means keeping the piston in longitudinal alignment with the cylinder wherein said piston reciprocates, elastic bearings arranged on said pin and connecting the same to the piston with freedom of transverse movement of the pin in relation to the piston; a slide secured to said pin and arranged around said piston for contacting said cylinder wall and sliding thereon whenever transverse force of the connecting rod forces the pin and the slide secured thereto to move transversely in relation to said piston.

4. A piston assembly arranged for reciprocation in a cylinder of an internal combustion engine including a piston and a pin connecting said piston with a connecting rod, said piston having an upper and a lower groove on the cylindrical side thereof; an upper and a lower guide ring located in said upper and lower grooves respectively; means arranged in said piston for yieldably urging said rings radially outwardly toward and against the cylinder wall, means for forcing said rings upwardly against the upper walls of said grooves, said rings in co-operation with the above first and second mentioned means keeping the piston in longitudinal alignment with the cylinder wherein said piston reciprocates; elastic bearings arranged on said pin and connecting the same to the piston with freedom of transverse movement of the pin in relation to the piston; a slide arranged circumferentially around the piston, said slide being secured to the pin and adapted to move with said pin transversely in relation to said piston to contact the cylinder wall and slide thereon whenever transverse force of the connecting rod forces the pin to move transversely.

5. A piston assembly arranged for reciprocation in a cylinder of an internal combustion engine including a piston and a pin connecting said piston with a connecting rod, said piston having an upper and a lower groove on the cylindrical side thereof; an upper and a lower guide ring located in said upper and lower grooves respectively; means arranged in said piston for yieldably urging said rings radially outwardly toward and against the cylinder wall, means for forcing said rings upwardly against the upper walls of said grooves, said rings in co-operation with the above first and second mentioned means keeping the piston in longitudinal alignment with the cylinder wherein said piston reciprocates; elastic bearings arranged on said pin and connecting the same to the piston with freedom of transverse movement of the pin in relation to the piston; a slide arranged circumferentially around the piston between said guide rings with freedom of transverse motion, said slide being firmly secured to said pin for motion therewith, said slide being adapted to contact said cylinder wall and slide thereon whenever the force applied by the connecting rod on the pin forces the latter to move transversely thereby transferring said force through said slide to said cylinder wall.

6. A piston assembly arranged for reciprocation in a cylinder of an internal combustion engine including a piston and a pin connecting said piston with a connecting rod, said piston having an upper and lower groove on the cylindrical side thereof; an upper and a lower guide ring located in the upper and lower grooves respectively; coil springs in said piston, means operatively connecting said coil springs with the guide rings for urging the same toward and against the cylinder wall; springs for forcing said rings upwardly against the upper walls of said grooves, said rings in co-operation with said springs and means keeping the piston centrally located in said cylinder and in longitudinal alignment with the same at all times, elastic bearings connecting said pin with the piston with freedom of transverse motion of said pin in relation to said piston; a cylindrical slide arranged circumferentially around said piston between said guide rings with freedom of transverse motion, said slide being firmly secured to said pin for motion therewith, said slide being adapted to contact said cylinder and slide thereon whenever the connecting rod displaces said pin in relation to said piston, thereby transferring the transverse force of the connecting rod through said pin and slide to said cylinder wall.

7. In a piston arranged for reciprocation in a cylinder of an internal combustion engine, having a guide ring, means for urging said ring radially outwardly against the cylinder, said means comprising a stationary centrally located toothed ring in said piston, movable sections having teeth thereof complementing the teeth on said toothed ring and contacting the inner surface of the guide ring, spring means for each movable section for moving the same in relation to said stationary ring, and thereby moving them outwardly radially from said stationary ring and pushing thereby said guide ring radially outwardly.

8. In a reciprocating engine piston having a guide ring, means for urging said guide ring to expand radially, said means including a plurality of sectors located inside of said guide ring and contacting the inner surface thereof, a stationary centrally located ring located inside of said sectors and contacting the same, means on said stationary ring and on said sectors for moving the latter radially outwardly from the former by moving the sectors circumferentially in relation to said stationary ring, so that the radial outward motion of the sectors forces the guide ring to expand, and means moving said sectors in relation to said stationary ring.

9. In a piston arranged for reciprocation in a cylinder of an internal combustion engine, including a pin connecting said piston with a connecting rod, a slide for transferring transverse forces from the pin directly to the cylinder, said slide consisting of two semi-cylindrical halves arranged around the middle part of the piston, with freedom of angular and transverse motion in relation to said piston, said slide being secured to said pin for motion therewith.

10. A piston assembly for a cylinder of an internal combustion engine, comprising a piston and a pin for connecting the piston to the connecting rod, said piston having an upper and a lower groove, a guide ring in each of said grooves, a spring means for pushing said guide ring outwardly radially, means operatively connecting said spring means with the guide ring, means for preventing longitudinal displacement of said rings in relation to the piston, said guide rings keeping said piston equally spaced from the cylinder wall, and means for transferring transverse forces acting on the pin directly to the cylinder wall.

11. A piston assembly for a cylinder of an internal combustion engine, comprising a piston and a pin for connecting the piston to the connecting rod, said piston having an upper and a lower groove, a guide ring in each of said grooves, a plurality of coil springs in said piston, means for operatively connecting said springs with said guide rings for pushing the latter radially outwardly, spring means for preventing longitudinal displacement of said guide rings in relation to the piston, said pin being flexibly connected to said piston and to said connecting rod; and a slide arranged around the piston for transferring transverse forces acting on the pin through said slide to the cylinder wall.

12. In a piston assembly for a cylinder of an internal combustion engine, including a piston said piston having an upper and a lower groove, a guide ring in each groove, a plurality of coil springs in said piston, a bell crank operatively connected with each of said coil springs, a stationary toothed ring arranged on said piston concentrically with each of said guide rings and in the same plane, means located between said stationary toothed ring and the respective guide ring and operatively connected with said bell crank for yieldably urging said guide ring to expand outwardly toward and in contact with said cylinder, said guide rings keeping said piston equally spaced from the cylinder wall.

References Cited in the file of this patent
UNITED STATES PATENTS

| | | |
|---|---|---|
| 87,789 | Morgan | Mar. 16, 1869 |
| 267,030 | Snyder et al. | Nov. 7, 1882 |
| 2,383,836 | Adams | Aug. 28, 1945 |
| 2,770,511 | Powell | Nov. 13, 1956 |